US006561572B1

(12) United States Patent
Martin, Jr.

(10) Patent No.: US 6,561,572 B1
(45) Date of Patent: May 13, 2003

(54) CAB ENCLOSURE CONSTRUCTION

(75) Inventor: Robert P. Martin, Jr., Fairview Park, OH (US)

(73) Assignee: Martin Sheet Metal, Inc., Cleveland, OH (US)

(*) Notice: Subject to any disclaimer, the term of this patent is extended or adjusted under 35 U.S.C. 154(b) by 53 days.

(21) Appl. No.: 09/775,397

(22) Filed: Jan. 31, 2001

(51) Int. Cl.⁷ .................................................. B60J 7/00
(52) U.S. Cl. ............................... 296/190.1; 296/190.11
(58) Field of Search ....................... 296/190.1, 190.11, 296/77.1, 96.21, 201, 190.08

(56) References Cited

U.S. PATENT DOCUMENTS

| | | | | |
|---|---|---|---|---|
| 2,997,333 A | * | 8/1961 | Kauffman et al. ..... | 296/190.11 |
| 3,967,859 A | * | 7/1976 | Whisler .................... | 296/190.1 |
| 4,079,985 A | | 3/1978 | Martin ........................ | 296/28 |
| 4,099,590 A | | 7/1978 | Martin, Sr. ............... | 180/69 C |
| D249,254 S | | 9/1978 | Martin, Sr. .................. | D12/61 |
| 4,133,574 A | | 1/1979 | Martin ........................ | 296/28 |
| 4,205,874 A | | 6/1980 | Martin ...................... | 296/102 |
| 4,221,274 A | | 9/1980 | Martin, Jr. ............... | 180/69 R |
| D267,486 S | | 1/1983 | Martin, Jr. ................... | D12/96 |
| 4,392,669 A | | 7/1983 | Martin, Jr. .................. | 280/775 |
| D274,276 S | | 6/1984 | Martin, Jr. ................... | D34/37 |
| D279,660 S | | 7/1985 | Martin, Jr. ................... | D12/96 |
| 4,619,479 A | | 10/1986 | Martin, Jr. ................. | 296/190 |
| 4,675,933 A | | 6/1987 | Martin, Jr. ................ | 15/250.3 |
| 4,688,846 A | | 8/1987 | Martin, Jr. .................. | 296/102 |
| 4,702,516 A | | 10/1987 | Martin, Jr. .................. | 296/190 |
| 5,002,332 A | * | 3/1991 | Ikeda .................... | 296/190.11 |
| 5,286,081 A | | 2/1994 | Martin, Jr. .................. | 296/190 |
| D348,553 S | | 7/1994 | Martin, Jr. ................... | D34/37 |
| 6,149,228 A | * | 11/2000 | O'Neill et al. ......... | 296/190.03 |
| 6,189,954 B1 | * | 2/2001 | Martin, Jr. ............. | 296/190.08 |
| 6,293,610 B1 | * | 9/2001 | Howard ................. | 296/77.1 X |

* cited by examiner

Primary Examiner—Joseph D. Pape
(74) Attorney, Agent, or Firm—Pearne & Gordon LLP

(57) ABSTRACT

A system, particularly suited for after market applications, for enclosing an overhead guard with window and prehung door assemblies. The window and door assemblies are arranged with portions that overlie outer surfaces of the guard and portions engageable with inner surfaces of the guard to retain the respective assemblies in place on the guard. The retaining structure of each of the assemblies extends through original vision or ingress/egress openings in the guard so that installation is simplified and structural alteration of the guard is avoided.

5 Claims, 6 Drawing Sheets

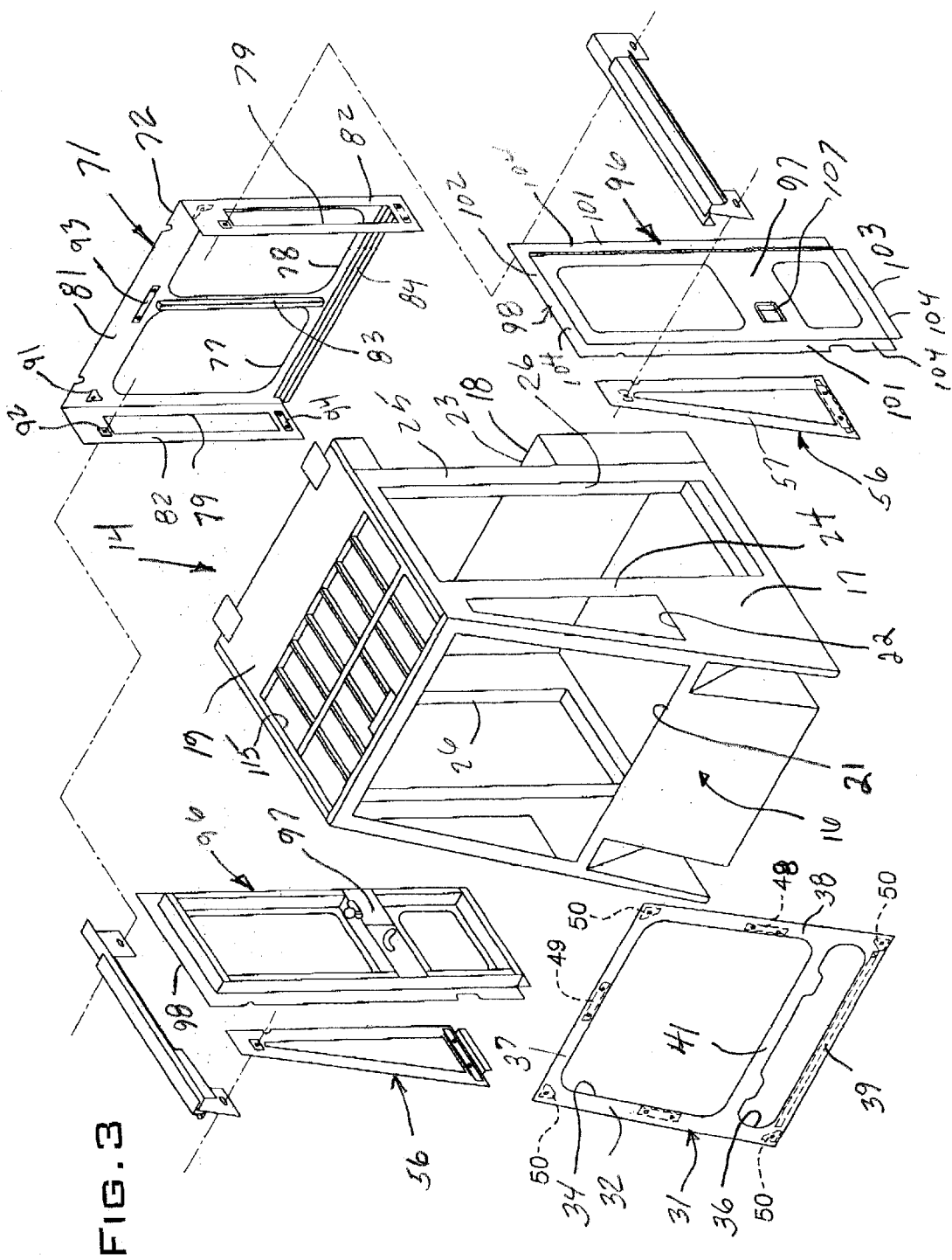

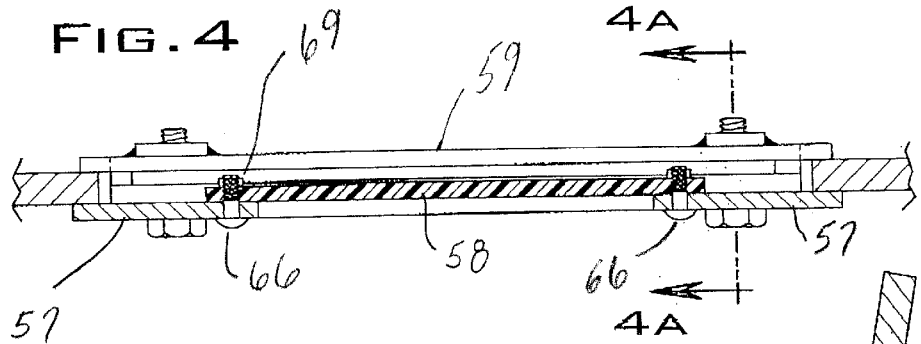
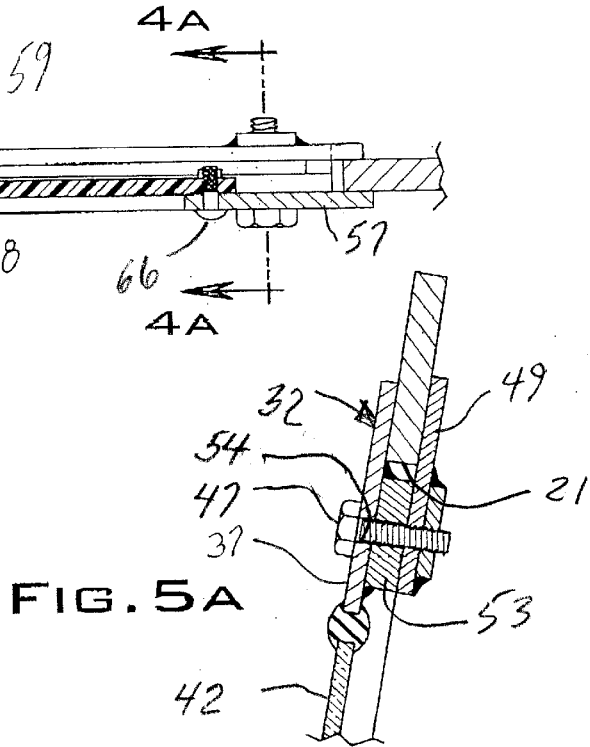
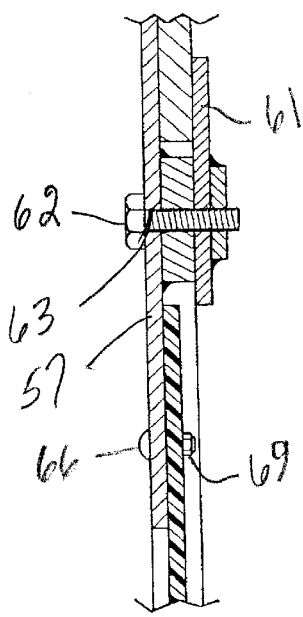
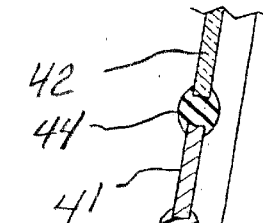
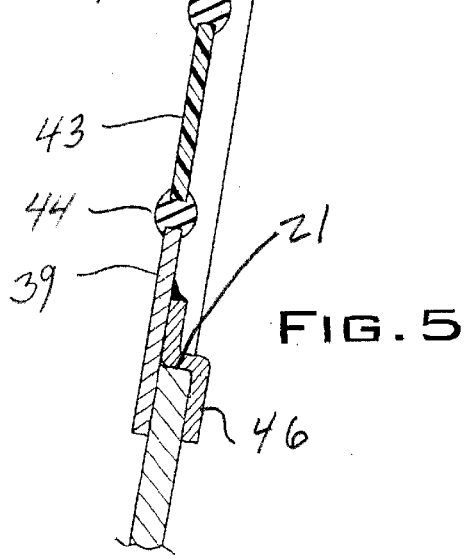
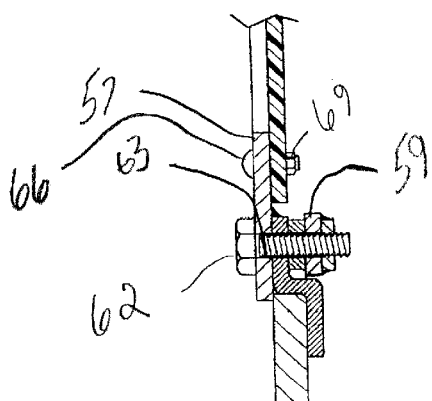

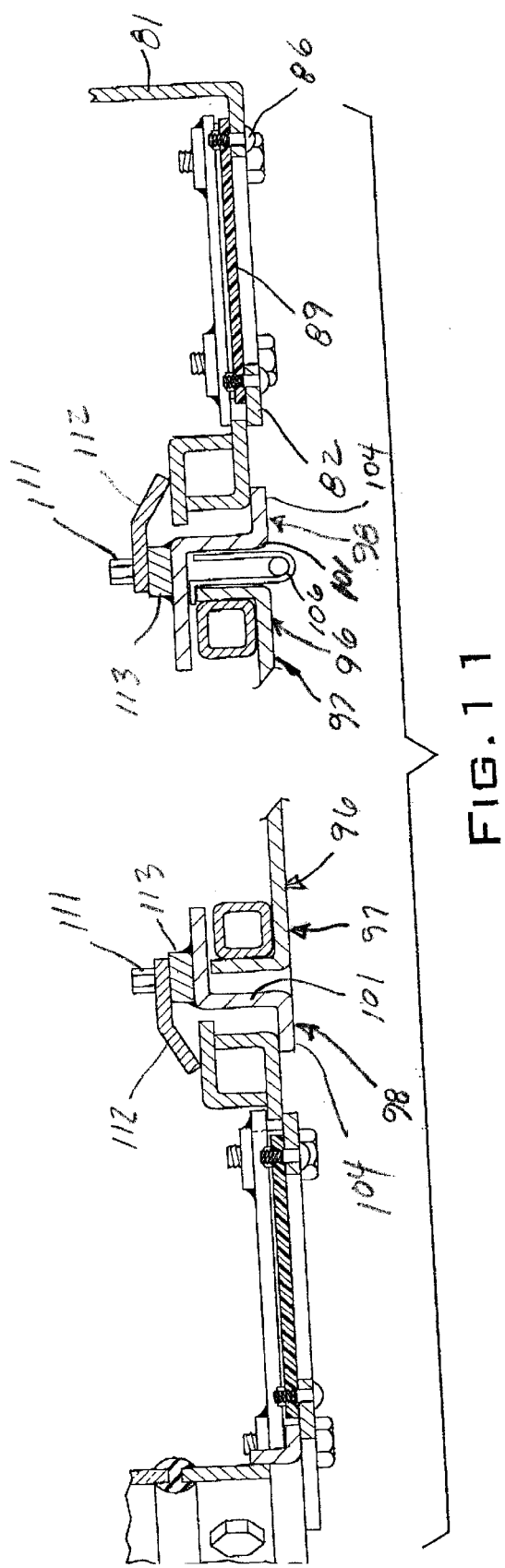

CAB ENCLOSURE CONSTRUCTION

The invention relates to cabs for off road land vehicles to protect the driver from adverse environmental conditions.

PRIOR ART

Land vehicles such as lift trucks, construction machinery, farm machinery and the like are frequently supplied with a cab enclosure to protect the driver or operator from severe weather, dust, noise or other environmental conditions. For reasons of cost and/or other factors, a vehicle may be originally manufactured without a fully enclosed cab. In many product lines, a vehicle may be manufactured and delivered to a dealer or end user with a factory built overhead guard. Such guards typically comprise an open framework or network fabricated from sheet stock, tubing and/or other structural steel shapes. It is known for a manufacturer to produce an overhead guard with sheet metal flanges that can be glazed with safety glass or shatter resistant plastic to form a windshield, side lights, and/or rear window in the event that a customer desires an enclosed cab. These glazing flanges, integrated with the factory installed overhead guard, are intended to allow glazing to be fitted at the factory or to facilitate dealer installation of the glazing panels. This approach of integrating glazing flanges with a guard, in theory, offers flexibility in meeting customer's demands. However, dealer installation of glazing may be troublesome because the available personnel may be inexperienced and ill-equipped to perform the necessary tasks.

SUMMARY OF THE INVENTION

The invention provides glazing assemblies particularly suited for dealer or after market installation on factory built overhead guards, particularly those originally manufactured with glazing flanges but originally sold without glazing. The glazing assemblies of the invention include conventional safety glass or shatter resistant plastic glazing and a rigid metal frame surrounding the perimeter of the glazing.

The glazing assemblies are arranged to span the openings in the overhead guard structure. As disclosed, the assemblies are retained on the cab with structural elements that extend through the planes of the original factory glazing flanges to enable the assembles to be mechanically clamped on the guard.

In accordance with another aspect of the invention, the ingress and egress areas of the guard are enclosed by prehung door assemblies. The disclosed door assemblies include a door jamb proportioned to fit onto strategic parts of the overhead guard. A door is hinge-mounted on the specially configured jamb. In a manner similar to the glazing assemblies, the door assemblies are clamped onto the original overhead guard structure. The disclosed glazing and door assemblies can be installed with personnel having no glazing experience with minimal instructional time and with little chance of error.

BRIEF DESCRIPTION OF THE DRAWINGS

FIG. 3 is a somewhat schematic exploded perspective view of the overhead guard and the glazing assemblies and prehung door assemblies of the invention;

FIG. 4 is a fragmentary cross-sectional view of a front corner or port window area of the overhead guard and an associated glazing assembly taken in the plane 4—4 indicated in FIG. 1;

FIG. 4A is a fragmentary cross-sectional view of the front port window assembly taken in the plane 4A—4A indicated in FIG. 4;

FIG. 4B is a fragmentary cross-sectional view of the front port window assembly taken in the plane 4B—4B indicated in FIG. 4;

FIG. 5 is a fragmentary cross-sectional view of a front windshield assembly taken in the plane 5—5 indicated in FIG. 1;

FIG. 5A is a fragmentary cross-sectional view of the front window assembly taken in the plane 5A—5A indicated in FIG. 1;

FIG. 11 is a fragmentary cross-sectional view of a side of the overhead guard, side window assembly, prehung door assembly, and rear window assembly taken in the plane 11—11 shown in FIG. 1.

DESCRIPTION OF THE PREFERRED EMBODIMENT

Figure 1:
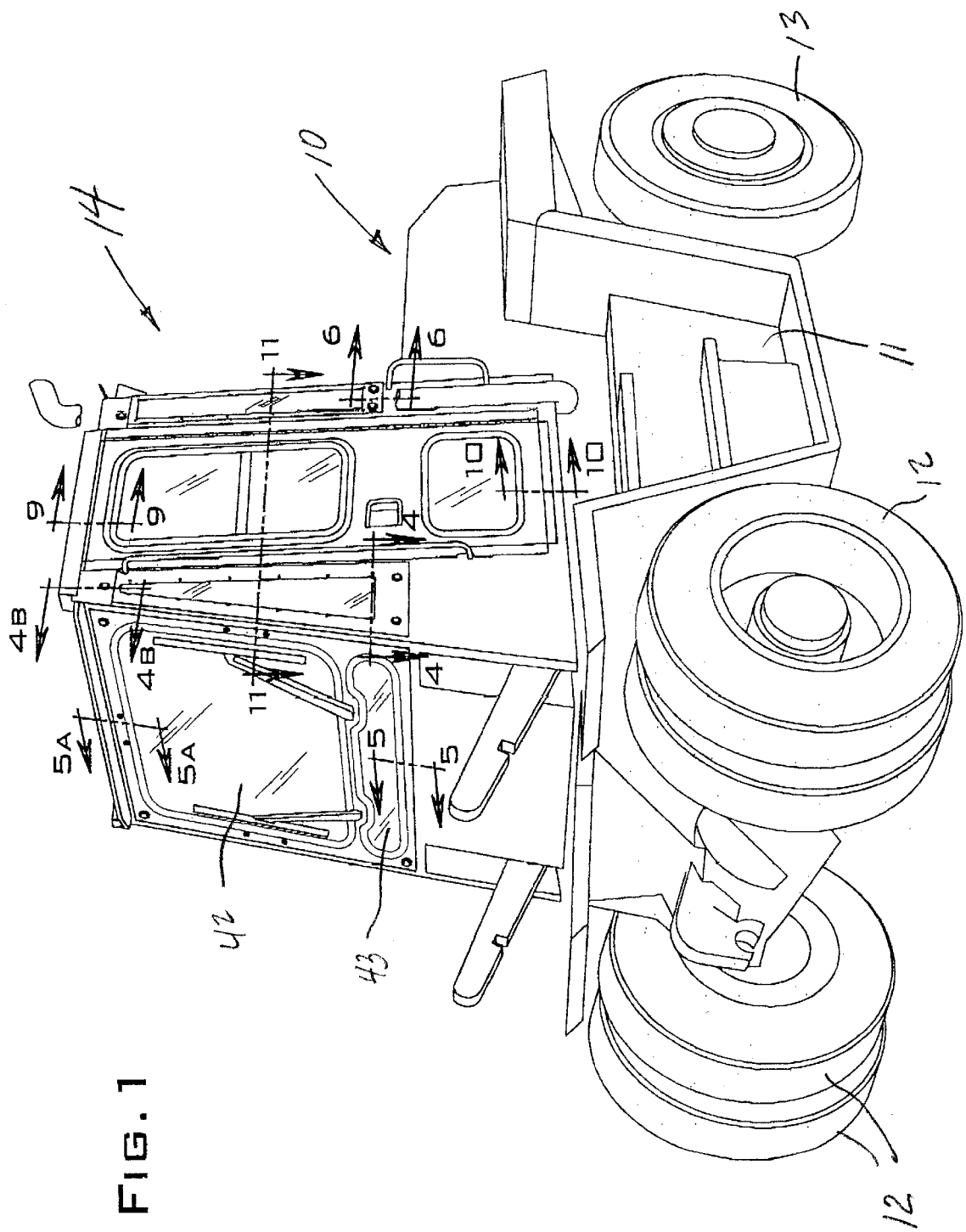
FIG. 1 is a front perspective view of a large lift truck having an overhead guard to which the present invention has been applied.
Figure 2:
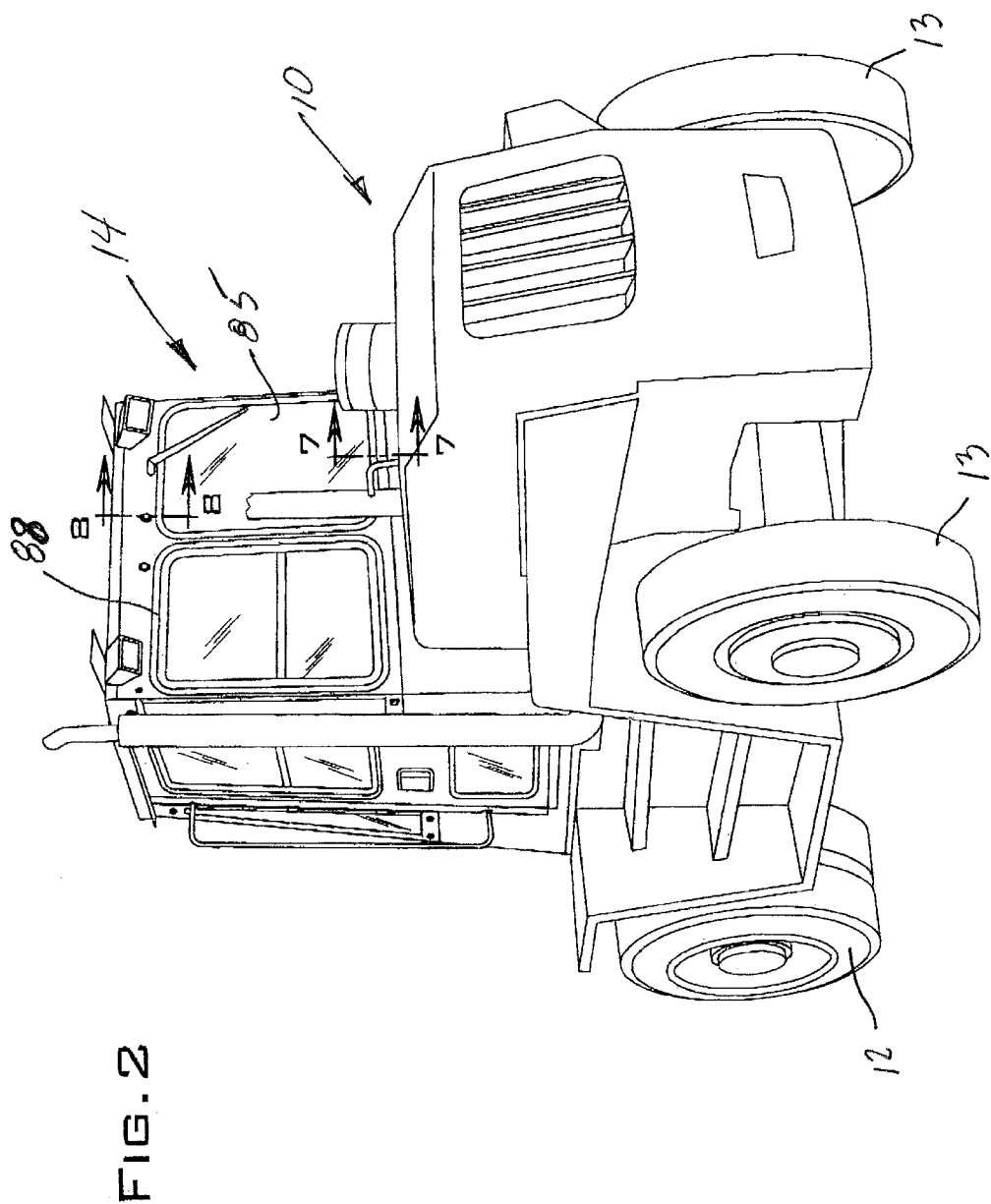
FIG. 2 is a rear perspective view of the lift truck and overhead guard to which the invention has been applied.
Figure 6:
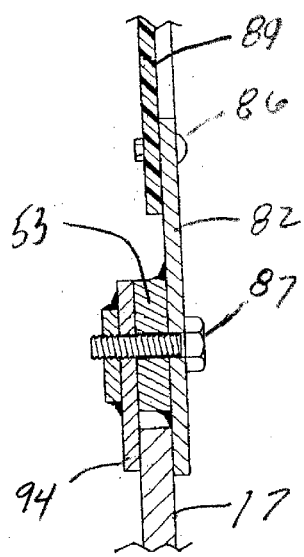
FIG. 6 is a fragmentary cross-sectional view of a rear window assembly taken in the plane 6—6 indicated in FIG. 1.
Figure 7:
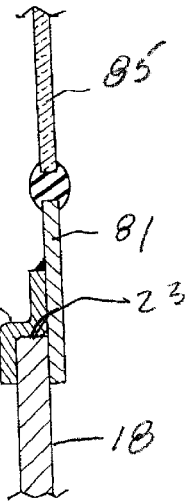
FIG. 7 is a fragmentary cross-sectional view of the rear window assembly taken in the plane 7—7 indicated in FIG. 2.
Figure 8:
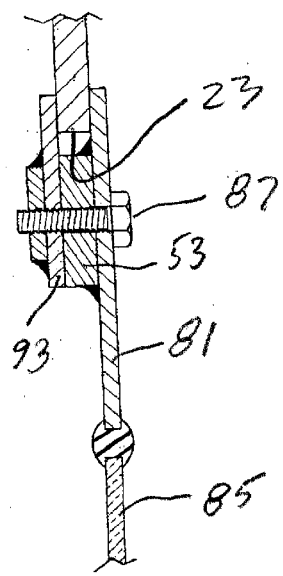
FIG. 8 is a fragmentary cross-sectional view of the rear window assembly taken in the plane 8—8 indicated in FIG. 2.
Figure 9:
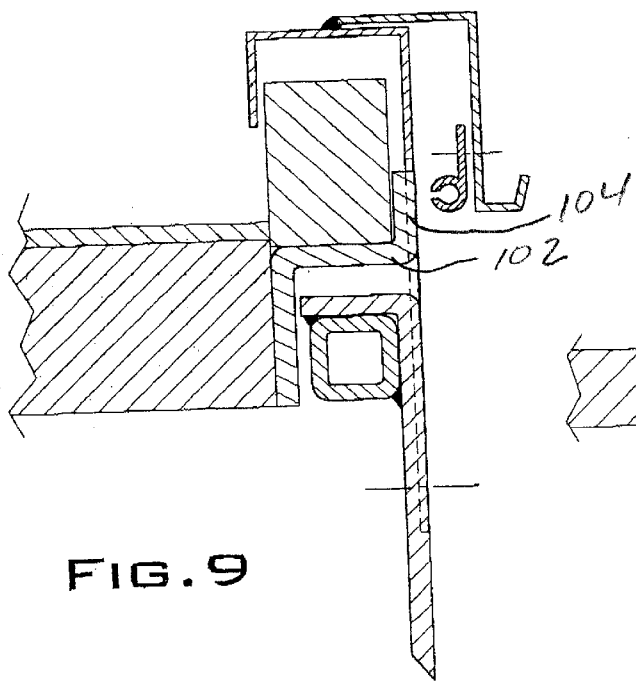
FIG. 9 is a cross-sectional view of a roof area of the overhead guard and an upper part of a prehung door assembly of the invention taken in the plane 9—9 indicated in FIG. 1.
Figure 10:
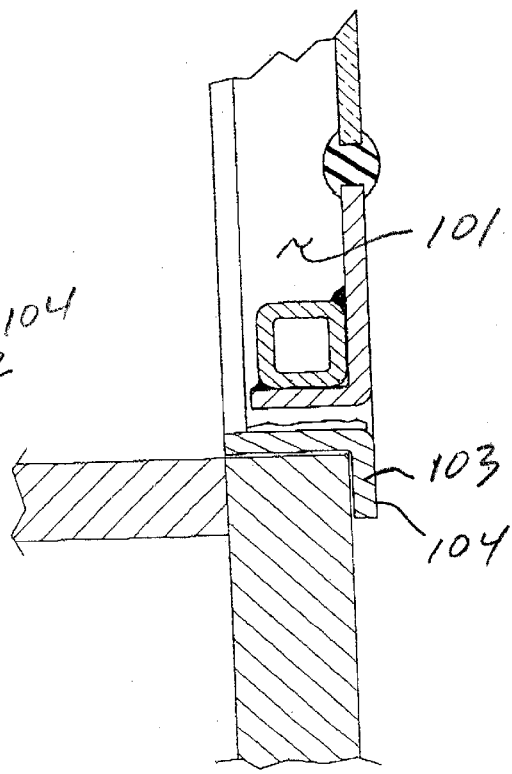
FIG. 10 is a cross-sectional view of the threshold area of the prehung door in the plane 10—10 indicated in FIG. 1.

Referring now to the figures and, in particular to FIGS. 1 and 2, there is shown an off highway land vehicle in the form of a large lift truck 10. A chassis 11 of the lift truck 10 has front wheels 12 and rear wheels 13. An engine and transmission (not shown) are mounted on the chassis to propel the truck 10 through the front wheels 12 in a conventional manner. Mounted on the chassis 11 is a factory installed overhead guard 14 most clearly shown in FIG. 3. The present invention is useful for situations where an original guard is shipped from the factory without glazing or doors and it is desired at a dealer or ultimate user level that the guard be fitted with windows and doors to provide a fully enclosed cab. The overhead guard 14 illustrated in FIG. 3 somewhat schematically illustrates a Hyster Lift Truck Model Series H 165XL/210XL. It will be understood from the present disclosure that the invention is applicable to other land vehicles and like machinery. The illustrated overhead guard 14 is of a type intended to be optionally fitted with safety glass or other suitable glazing. To this end, front, side and rear faces 16, 17 and 18, of the guard 14 have window openings 21, 22 and 23 bounded by flat sheet metal structure or flanges.

The overhead guard 14 is typically fabricated of structural steel elements. The front, side and rear faces 16, 17 and 18 of the guard are generally vertical. At or near the intersections of the front, sides and rear faces, the guard has four generally vertical post structures 24, 25 that support a generally horizontal roof 19. The boundaries of the front and side window openings 21, 22 are each planar and are formed by sheet steel of a moderate gauge of about 3/16 inch, for example. The boundary of the rear window 23 is similar in character except that it has a wrap around design that comprises a planar back portion bounded at its top and bottom by flat sheet stock and planar side portions generally at right angles to the back portion and each bounded at its top, forward side, and bottom edges by planar sheet stock. As with the front of the guard, the rear parts of the guard bounding the rear window 23 can have a moderate gauge of about 3/16 inch, for example.

At the sides 17 of the guard 14 between the front side port window openings 22 and side portions of the rear window opening 23 are large, rectangular openings 26 for access and egress of the operator to and from an operator's station or driver's seat within the guard.

A front windshield assembly 31 for closing the front window area or opening 21 of the guard 14, constructed in accordance with the invention, comprises a rigid perimeter frame 32 and safety glazing 42, 43. (For clarity, the glazing panels or sheets are omitted in the illustration of FIG. 3.) The frame 32 is generally planar and has a generally rectangular configuration corresponding to the shape of the front window area 21. Preferably, the frame 32 is fabricated primarily of sheet steel but can be made of other suitable materials such as aluminum or plastic. The outside dimensions of the frame 32 are slightly larger in both the vertical and horizontal directions than corresponding dimensions of the window opening 21 and the frame has openings 34, 36 which collectively are smaller than the corresponding dimensions of the window opening or area 21. With this configuration, top, side and bottom elements 37, 38 and 39 of the perimeter frame 32 when installed on the guard 14 each cover a marginal part of adjacent underlying surfaces of the guard front face 16 at the window opening 21 and a peripheral part of the window opening itself. In the illustrated construction, the frame 32 includes a muntin or bar 41 dividing the areas forming the upper and lower openings or lights 34, 36. The upper main light or opening 34 is preferably glazed with laminated safety glass 42 and the lower light or opening 36 is preferably glazed with clear polycarbonate sheet stock 43 or other suitable shatter-resistant plastic. Both glazing sheets 42, 43 are preferably mounted on the sheet stock of the frame 32 with extruded rubber strips 44, known in the art.

The windshield assembly 31 is retained on the guard 14 with mechanical fastening elements that extend through the original window opening 21 thereby avoiding structural alteration of the guard 14 and possible compromise of its integrity. In the illustrated example, these fastening elements include a lower Z-strip 46 (FIG. 5) and machine screws 47 (e.g. FIG. 5A). The Z-strip 46 which is welded or otherwise fixed to the frame 32 hooks over the lower edge of the window opening 21 to grasp the guard 14 at this location. The screws 47 located at spaced locations around the perimeter of the window opening 21 engage threaded holes in associated clamp plates 48, 49 and 50 positioned within the guard 14. As shown for example in FIG. 5A, the clamp plates 49, 48 are each proportioned to receive its associated screw 47 at a location within the boundary of the window opening 21 and to bear against the inside face of the guard flange surrounding the window opening. Spacers 53 such as typically shown in FIG. 5A can be provided between the clamp plates 48–50 to generally align the associated clamp plate in parallel relation to the part of the guard structure it clamps against. The spacers 53 are preferably welded to the frame 32. The threaded holes of the clamp plates 48–50 can be provided by weld nuts as shown.

The glazing sheets 42, 43 are preferably factory mounted on the frame 32 preferably at the factory where the window assembly is made and thus before the windshield assembly 31 is installed on the guard 14. Installation of the assembly 31 is facilitated by the Z-strip 46 which, when hooked over the lower edge of the window opening 21 is capable of supporting the weight of the assembly while the retaining screws 47 are assembled through clearance holes 54 in the frame 32, registered with associated clamp plates 48–50 and finally tightened into such clamp plates. FIG. 5A shows typical details of the arrangement of a retaining bolt or screw 47 and a clamp plate 49 at points spaced around the perimeter of the window opening 21.

A front side port window assembly 56 includes a generally triangular perimeter frame 57 fabricated from steel sheet stock and safety glazing 58 in the form of clear polycarbonate or other suitable shatter-resistant glazing sheet material. Like the front windshield assembly 31, the outside dimensions of the frame 57 are larger than corresponding dimensions of an associated side port opening 22 and the inside dimensions are smaller than the corresponding dimensions of such opening. In the installed condition, the frame 57 abuts the outside surface of the guard 14 surrounding the port opening 22 and the glazing fits within this opening. The frame 57 is held in place by a lower clamp plate 59 and an upper clamp plate 61 positioned against the inside surface of the guard below and above the glazing 58. The frame 57 is held against the guard by tightening machine screws 62 assembled through holes 63 in the frame into respective ones of the clamp plates 59, 61. Again, like the windshield assembly 31, the frame 57 is proportioned so that the screw receiving holes 63 are within the boundary of the side port opening 22 so that the need for cutting or drilling holes in the guard or other like alteration is avoided. The glazing 58 is held in place against the inner face of the frame 57 by machine screws 66 assembled through aligned holes in these members within the boundary of the side port opening 22 and tightened into nuts 69 on the inside face of the glazing 58.

A rear windshield assembly 71 comprises a rigid frame 72 and glazing units 85, 88 and 89. The frame 72, in the illustrated example, is fabricated from steel sheet stock having cutouts or openings 77, 78 and 79 (FIG. 3) for rear and rear side vision. The frame 72 has a generally planar rear section 81 including the two large cutouts 77, 78 and two side sections 82 formed by bending the sheet into a U-shape or wrap around configuration. The side sections 82 include the side port cutouts 79. A rightward one 77 of the large cutouts is fitted with laminated safety glass 85 or other suitable glazing mounted in a conventional elastomeric extrusion. The other large cutout 78 is fitted with a double-hung window frame 88 carrying suitable safety glazing. This double-hung frame 88 is mounted in the cut-out 78 with suitable elastomeric extrusion material known in the art. A vertical reinforcing bar or mullion 83 is welded to a central part of the rear section 81. A Z-strip 84 is welded on the inside lower margin of the rear section 81 to form an inverted channel. Glazing units 89 of polycarbonate or other suitable shatter-resistant glazing material are attached to the side sections 82 of the frame 72 over the side port openings 79 by machine screws 86 or other suitable known fastening medium.

The Z-strip 84 is positioned so that it can be hooked over the lower edge of the rear window area 23 to thereby support the weight of the assembly 71 as it is being installed on the guard. The assembly 71 is retained on the guard 14 in a manner like that of the front windshield assembly 31. The perimeter elements of the frame 72 surrounding the cutouts 77–79 overlie portions of the guard surrounding the rear opening 23 and adjacent areas within the boundary of the opening. Machine screws 87 are assembled through holes spaced along the perimeter of the frame 72 and pass through areas of the rear opening 23 and are tightened into retaining plates 91, 92 and 93 positioned on the inside of the guard. The plates 91–93 bear against the inside surfaces of the guard so that when the screws 86 are fully tightened, the frame 72 is securely held in place on the outside of the guard. Again, as with previously described window assemblies 31, 56 no structural modification of the guard is required for mounting the rear windshield assembly 71.

The guard 14 is fitted with generally symmetrical right and left hand door assemblies 96. In accordance with the invention, the door assemblies 96 each comprise a door 97 "pre-hung" on a door frame 98. In the construction illustrated, the door frame 98 is a rectangular steel framework including jambs 101, a header 102 and a threshold 103 all welded or otherwise joined rigidly together. Preferably, the frame members 101–103 include outer flanges 104 generally coplanar with each other and adapted to abut the outer face area of the guard 14 surrounding the passage opening 26. The door 97 is pivotally mounted to a rearward one of the jambs 101 with a continuous hinge 106. A conventional door latch assembly generally indicated at 107 releasably holds a door closed in the frame 98. Each door assembly 96 is secured in place in the opening 26 by a plurality of retaining bolts 111 and bracket elements 112 located at vertically spaced locations on the jambs 101. The retaining bolts or screws 111 are threaded into internally threaded bosses 113 welded onto the jambs 101. The brackets 112 are arranged, when the bolts 111 are tightened to bear against inside surfaces of the guard to draw the flanges 104 of the jambs 101 against the outer surfaces of the guard. It will be understood from the foregoing that the door assemblies 96 are secured in place on the guard 14 by clamping elements 111, 112 that develop a grip on both faces of the sides of the guard 14 without requiring structural modification of the guard. The roof 19 of the guard can be partially covered with a transparent glazing sheet fitted over the roof opening 115 to enclose this area of the guard.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An off road land vehicle having a cab originally fabricated with metal sheet material, the cab including at least one uninterrupted window area with a perimeter, the window area perimeter being formed by said sheet material and having a substantially closed boundary, and a glazing unit on one side of the sheet material for enclosing the window area, the glazing unit including a rigid peripheral framework having dimensions larger than the window area and a sheet of safety glazing carried by the framework, the framework being secured to the cab by fasteners extending through the window area and within its boundary, the fasteners being arranged to apply a retaining force on a side of the sheet material opposite said one side for holding the glazing unit in place.

2. An off road land vehicle as set forth in claim 1, wherein said cab includes an opening for ingress and egress of an operator, a generally rectangular door jamb assembled onto said cab in said opening, a door, adapted to be prehung on said door jamb, said door being hinged on said door jamb.

3. An off road land vehicle as set forth in claim 2, wherein said door jamb is secured to said cab by clamping elements disposed on opposite sides of said ingress and egress opening.

4. A method of glazing a cab for an off road vehicle having at least one window area surrounded by rigid structure, the window area being uninterrupted and having a perimeter formed by a single layer of metal sheet stock that is a part of the original metal cab fabrication, comprising providing a rigid perimeter frame, larger than the window area, with safety glazing, positioning the perimeter frame with the safety glazing mounted thereon across the window area on one side of the metal sheet stock, securing the perimeter frame to the cab structure with fasteners extending through the window area and anchored by elements contacting the other side of the metal sheet stock, the fasteners being arranged so that when tightened, they draw the perimeter frame towards the rigid structure and thereby secure it to the rigid structure.

5. A kit for enclosing an overhead guard of an off road vehicle comprising at least one window assembly and one door assembly, the window assembly including a rigid perimeter frame and a safety glazing panel, the safety glazing panel being secured to the perimeter frame and covering an area bounded by the perimeter frame, the window assembly being adapted to overlie an original window face area of said overhead guard and including retaining structure adapted to extend through a plane defined by outward facing window area surrounding surfaces of the original guard formed by a single layer of sheet metal that is part of the original overhead guard fabrication and that forms the boundary of the original window area between a pair of generally upright corners of the guard and adapted to engage inwardly facing surfaces of said sheet metal to retain the window frame on the outward facing surfaces of said sheet metal, the door assembly including a frame with a generally rectangular configuration including a pair of generally vertical jambs and a door hinged on the frame, the frame including flange elements adapted to engage outwardly facing door frame receiving surfaces of the overhead guard and retaining structure adapted to extend through a plane defined by said outwardly facing door frame receiving surfaces and engage inwardly facing surfaces of the guard to retain the door frame on said outwardly facing door frame receiving surfaces.

* * * * *